US011984820B2

United States Patent
Duppalli et al.

(10) Patent No.: US 11,984,820 B2
(45) Date of Patent: May 14, 2024

(54) SYSTEMS AND METHODS FOR INCREASING EFFICIENCY OF A POWER CONVERTER

(71) Applicant: Cummins Power Generation Inc., Minneapolis, MN (US)

(72) Inventors: Veda Samhitha Duppalli, Quincy, MA (US); Lane Lester Woodland, Eden Prairie, MN (US); Vineet K. Pandey, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 44 days.

(21) Appl. No.: 17/514,761

(22) Filed: Oct. 29, 2021

(65) Prior Publication Data

US 2022/0140750 A1 May 5, 2022

Related U.S. Application Data

(60) Provisional application No. 63/107,847, filed on Oct. 30, 2020.

(51) Int. Cl.
*H02M 7/5387* (2007.01)
*H02M 1/12* (2006.01)
*H02M 7/5395* (2006.01)

(52) U.S. Cl.
CPC ......... *H02M 7/5395* (2013.01); *H02M 1/126* (2013.01); *H02M 7/5387* (2013.01)

(58) Field of Classification Search
CPC ........ H02M 1/12; H02M 1/123; H02M 1/126; H02M 7/42; H02M 7/44; H02M 7/48;
(Continued)

(56) References Cited

U.S. PATENT DOCUMENTS

| 3,555,291 A | 1/1971 | Dewey |
| 3,881,137 A | 4/1975 | Thanawala |

(Continued)

FOREIGN PATENT DOCUMENTS

| DE | 27 33 930 A1 | 2/1979 | |
| DE | 102013100769 A1 * | 7/2013 | ............ H02M 1/126 |
| KR | 900004084 A | 3/1990 | |

OTHER PUBLICATIONS

Mehmet Büyük; Adnan Tan; Mustafa İnci; Mehmet Tumay; "A notch filter based active damping of Ilcl filter in shunt active power filter"; Dec. 11, 2017; IEEE; 2017 International Symposium on Power Electronics (Ee); pp. 1-5 (Year: 2017).*

(Continued)

*Primary Examiner* — Thienvu V Tran
*Assistant Examiner* — Shahzeb K Ahmad
(74) *Attorney, Agent, or Firm* — Foley & Lardner LLP

(57) ABSTRACT

Systems and methods for increasing the efficiency of inverters are provided. In some embodiments, an inverter may be configured to connect to a direct current power source and output alternating current power. The inverter may include one or more transistors configured to receive a direct current signal and output a pulse width modulated signal having a particular switching frequency or spread spectrum frequencies. The inverter also includes a low pass filter having multiple elements where each of the multiple elements have parasitic characteristics. One or more of the multiple elements may be designed such that the frequency response has a notch or a minimum at the switching frequency while having a desired cutoff frequency.

20 Claims, 3 Drawing Sheets

(58) Field of Classification Search
CPC .. H02M 7/4803; H02M 7/4833; H02M 7/483; H02M 7/487; H02M 7/53; H02M 7/537; H02M 7/538; H02M 7/5387; H02M 7/539; H02M 7/5395
See application file for complete search history.

(56) References Cited

U.S. PATENT DOCUMENTS

| | | | |
|---|---|---|---|
| 4,622,474 A | 11/1986 | Christl et al. | |
| 4,937,719 A | 6/1990 | Yamada et al. | |
| 11,177,732 B1* | 11/2021 | Zhang | H02M 1/0003 |
| 2002/0113585 A1 | 8/2002 | Dillig et al. | |
| 2013/0088080 A1* | 4/2013 | Smith | H02M 1/126 |
| | | | 307/43 |
| 2013/0329471 A1* | 12/2013 | Escobar | H02M 7/42 |
| | | | 363/40 |
| 2015/0235971 A1* | 8/2015 | Smith | H01L 23/66 |
| | | | 29/832 |
| 2020/0021204 A1* | 1/2020 | Huang | H02M 7/5395 |
| 2020/0412320 A1* | 12/2020 | Reid | H03H 7/06 |

OTHER PUBLICATIONS

Rohit G. Ramteke; U. V. Patil; "Design and comparative study of filters for multilevel inverter for grid interface"; Dec. 11, 2014; IEEE; 2014 International Conference on Power, Automation and Communication (INPAC); pp. 39-44 (Year: 2014).*

Mehmet Biyiik; Adnan Tan; Mustafa inci; Mehmet Timay; "A notch filter based active damping of Ilcl filter in shunt active power filter"; Dec. 11, 2017; IEEE; 2017 International Symposium on Power Electronics (Ee); pp. 1-5 (Year: 2017).*

International Search Report and Written Opinion for international application No. PCT/US2021/057346 dated Feb. 14, 2022. (24 pages).

Velander Erik et al: "An Ultralow Loss Inductorless dv/dt Filter Concept for Medium-Power Voltage Source Motor Drive Converters With SiC Devices". IEEE Transactions on Power Electronics, Institute of Electrical and Electronics Engineers, USA, vol. 33, No. 7, Jul. 1, 2018, pp. 6072-6081.

Kshirsagar, P. M. (2003). PWM strategies in power converters: a thesis presented to the faculty of the Graduate School, Tennessee Technological University.

Xu, et al. "A New Inverter Output Passive Filter Topology for PWM Motor Drives" (The Eighth International Conference on Electronic Measurement and Instruments),2007.

* cited by examiner

SYSTEMS AND METHODS FOR INCREASING EFFICIENCY OF A POWER CONVERTER

CROSS REFERENCE TO RELATED APPLICATION

This application claims the benefit of and priority to U.S. Application No. 63/107,847, filed Oct. 30, 2020, which is incorporated herein by reference in its entirety.

TECHNICAL FIELD

The present disclosure relates generally to electric power transmission. More particularly, the present disclosure relates to systems and methods for increasing efficiency of an inverter of a power source.

BACKGROUND

A power source may be configured to supply power to a load or receive power from a grid via an inverter. For example, renewable power sources such as a solar panel may generate direct current power that is inverted to supply alternating current power to a load. In another example, an energy storage system may include a power storage unit (e.g., batteries, capacitors, etc.) that is able to selectively supply alternating current power to a load or grid at a particular frequency or spread spectrum frequencies via an inverter. The inverter may be controlled via a controller that causes a pulse width modulated signal to be generated that is then filtered via a low pass filter (LPF) to supply the alternating current power at the correct frequency.

SUMMARY

One implementation is related to a system, the system includes a power source (e.g. direct current power source), an inverter, and/or a controller. The inverter is connected to the direct current (DC) power supply and configured to output an alternating current (AC) signal. The inverter includes one or more transistors configured to receive a DC signal from the DC power supply and output a pulse-width modulated signal at a switching frequency. The switching frequency may be predefined within the controller. The inverter also includes a low pass filter (LPF) having a frequency response with a first notch at the switching frequency using the parasitic characteristics of the elements of the LPF. In some embodiments, the LPF may include a first inductor connected to an output of the one or more transistors, a capacitor connected to the first inductor and to a common terminal via a first wire, and a second inductor connected to the first inductor and the capacitor in parallel and an output terminal. The capacitor has a first parasitic inductance and the first wire has a second parasitic inductance. The first parasitic inductance and the second parasitic inductance have a series inductance that is configured to cause the first notch in the frequency response of the LPF at the switching frequency. The second parasitic inductance is based on a type and length of the first wire.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
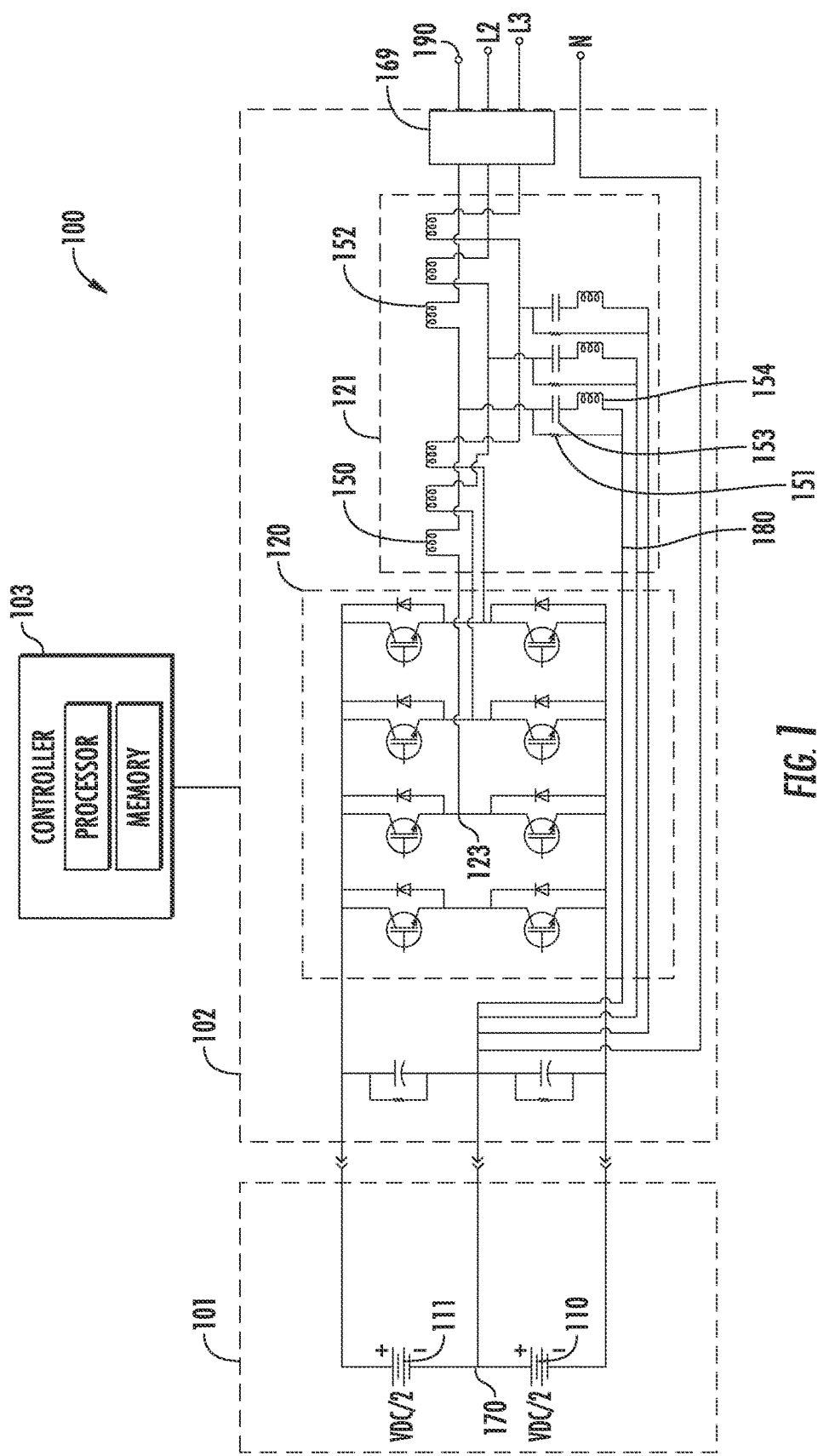
FIG. 1 is a schematic diagram illustrating a system having an inverter according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for increasing the efficiency of an inverter is provided according to exemplary embodiments. A power source may be configured to connect to a grid (e.g., a residential distribution network, micro-grid, etc.), a network (e.g., a telecommunications network) or load via an output terminal. In some embodiments, the power source may include an inverter that is configured to convert direct current (DC) power to (AC) power at a particular frequency and output the AC frequency. In some embodiments, the particular frequency may include a spread spectrum frequency. For example, an inverter may include one or more transistors that are configured to output a pulse-width modulated signal at a particular frequency that is then filtered via a low pass filter (LPF) in order to supply the AC power. Yet, the LPF may have particular resonance characteristics that adversely affect the filtering capabilities and cause stability issues in the AC signal. In some applications, variations or extraneous frequencies in the AC power may cause damage to a load or cause the power source to be out of compliance with regulations. In some embodiments, a resistor may be used within a low pass filter (LPF) of the inverter to ensure dampening of particular frequencies and increased stability. However, such resistors can cause significant heat losses in the system and consequentially decrease the efficiency of the LPF and inverter.

Accordingly, the present disclosure discusses alternative approaches to increasing the efficiency of inverters while also maintaining desirable output qualities of an AC signal from the respective inverters. For example, in an embodiment, a power source may include a DC power source (e.g., a battery pack) connected to an inverter. The inverter may include one or more transistors configured to be controlled via a controller and a LPF circuit. The transistors may be controlled by the controller in order to output a pulse-width modulated (PWM) signal at a particular switching frequency and the LPF receives the PWM signal and outputs an AC signal. The LPF may include an LCL filter. However, while an LCL may provide for desirable attenuation above a cut-off frequency, the LCL filter has resonances and unstable states that must be accounted for in order to provide a stable AC signal. In order to account for the resonances and unstable states, parasitic characteristics of the filter elements may be used to shift the resonance in the LCL filter to attain maximum attenuations at the particular switching frequency. That is, a particular switching frequency of a corresponding inverter may be the most prominent frequency that needs to be filtered in order to ensure a high quality AC signal is generated. Accordingly, by using the parasitic characteristics of the elements used in the LPF filter, the resonance effects on the bandwidth of the inverter may be reduced and also the efficiency of the inverter may be increased by reducing the need for excess damping resistors.

Referring to FIG. 1, a schematic diagram illustrating a system 100 including a power source 101, inverter 102, and a controller 103 according to an exemplary embodiment. The power source 101 is configured to generate or store DC power and supply DC power to the inverter. In some embodiments, the DC power may be power that is meant to supply operational power to a load or grid. In some embodiments, the DC power may be a DC signal that is meant to be used in a communications network (e.g., a telecommunications network). The power source 101 includes a first battery pack 110 and a second battery pack 111 connected in series having a common terminal 170 there between. In some embodiments, the power source 101 may include additional battery packs or battery packs in other configurations. In some embodiments, the power source 101 may include various different elements or components configured to store or supply DC power therefrom. For example, the power source 101 may include capacitors, super capacitors, solar panels, lithium-ion batteries, or a combination thereof.

In some embodiments, the system 100 may be configured to connect or be coupled to a power grid (e.g., a utility grid or micro grid) in parallel with a generator set or multiple generator sets and loads via common bus via an output of the inverter 102. The inverter 102 may be configured to receive power supplied from the one or more generator sets in order to store DC power in the power source 101. That is, in some embodiments, the inverter 102 may be bi-directional such that the inverter 102 can selectively supply power to the grid from the power source 101 and store power within the power source 101. In other embodiments, the power source 101 may be a renewable energy source that does not store power (e.g., a solar panel or solar panel array) and the inverter 102 may be omni-directional. The loads may depend on the application in which the system 100 is being deployed and thereby nature of the loads (e.g., resistive, inductive, or capacitance) may be contemplated and accounted for in the design of the inverter with similar techniques described herein.

In some embodiments, the controller 103 may be communicably coupled to one or more generator sets or loads when connected in parallel. The controller 103 may communicate with respective controllers via an input/output interface that allows for serial communication, communication via a network (e.g., Ethernet), and/or wireless communication (e.g., via a Bluetooth connection, a local area network, or radio frequency communication). In such an example, the controller 103 may selectively control the inverter 102 to supply power (e.g., via the common bus) to the grid or load in order to maintain the generator sets within one or more pre-defined operating conditions. Moreover, the controller 103 may communicate with the respective controllers of the loads and generator sets to receive information regarding the nature of the loads (e.g., magnitude, resistive nature, inductive nature, etc.), information regarding the nature of the generator sets (e.g., total power capacity, current power output, etc.), and/or transmit information to the generator sets (e.g., such as the power available in the power source 101). In other embodiments, the controller 103 may be configured to communicate with a master controller that is configured to manage the power flow within a micro-grid.

The inverter 102 is configured to receive DC power (e.g., a DC signal) from the power source 101, convert the DC power to AC power (e.g., an AC signal), and output the AC power. The inverter 102 includes a driver 120 and a low pass filter (LPF) 121. The driver 120 is coupled to the controller 103 and configured to receive the DC signal from the power source 101, generate a pulse width modulated signal (e.g., a square signal), and output the square signal to the LPF 121. The LPF 121 is configured to receive the square signal and filter high frequency components of the square signal to output an AC signal to a load 169. The driver 120 includes multiple transistors that have gates connected to the controller 103 and are configured to be turned on and off by the controller 103 such that the driver 120 outputs three different outputs (e.g., 3 phases) of pulse width modulated (PWM) signals at a switching frequency designated by the controller 103. In some embodiments, the transistors may be insulated gate bipolar transistors (IGBT), metal oxide silicon field effect transistors (MOSFETs), or other types of transistors. In some embodiments, the driver 120 may include other types of PWM wave inverters or modified sine wave inverters. In some embodiments, the driver 120 may be configured to generate single, double, triple or more phases.

The LPF 121 may have a LCL filter for each phase. For example, a first phase may include a first inductor 150 connected to a first output 123 of the driver 120 at a first terminal and connected to a first capacitor 153 and a second inductor 152 at a second terminal. The first capacitor 153 is connected between the first terminal of the first inductor 150 and the common terminal 170 of the system 100 via a first wire 180. The first wire 180 may include a first length of wire connecting a first terminal of the capacitor 153 to the first inductor 150 and a second length of wire connecting a second terminal to the common terminal 170. The capacitor 153 and the first wire 180 have a parasitic inductance and/or a parasitic resistance that is represented schematically as an equivalent series inductor 154. The second inductor 152 is connected between the second terminal of the first inductor 150 and a first output terminal 190 of the system 100. A similar configuration of the LPF can be implemented for each phase (e.g., and output terminal of the driver 120). In some embodiments, other types of LPFs may be implemented for each phase depending upon the application in which the system is being deployed.

The values of the elements of the LCL filter of the LPF 121 may be selected to filter out frequencies above a predetermined cutoff frequency (e.g., selected based on the application). For example, in some power applications the cutoff frequency may be selected to be in the range of about 1 to about 1.5 kilo-hertz (kHz) and the predefined switching frequency may be in the range of about 10 to about 15 kHz. The LCL configuration may have particular resonances and unstable states in the frequency response of the LPF 120. Moreover, the LCL may be vulnerable to oscillations and/or magnify frequencies around the predetermined cut-off frequency.

The first inductor 150, the capacitor 153, and second inductor 152 include parasitic characteristics that affect the frequency response of the LPF 121. For example, the first inductor 150 and the second inductor 152 may include a parasitic capacitance and/or parasitic resistance and the capacitor 153 may include a parasitic inductance and/or parasitic resistance (e.g., represented at a resistor 151). Moreover, the connections between the elements (e.g., first wire 180) also include a parasitic inductance (e.g., represented inductor 154) and/or parasitic resistance. The length of the first wire 180 (or lengths of the total wire in the connections) may be based on a known parasitic inductance per length of wire such that the resonance of the LCL is shifted to attain maximum attenuation at the switching frequency while also maintaining the desired cutoff frequency. Thus, the potential effects of resonance on the bandwidth of the inverter may be compensated for based on the length of wire 180 and parasitic inductance of the capacitor 153 in order to ensure that filter is maximally attenuating the PWM signal at the switching frequency. This may also reduce the need for an extra dampening resistor that would increase the number of elements needed and energy loss of the LPF 121.

It is to be appreciated that the schematic diagram of the system 100 is meant to be an example for explanatory purposes and that in other embodiments, the system 100 may include various other elements such as an input filter, a DC-to-DC converter, or other components that are not depicted. Moreover, the LPF may be designed with parasitic compensations based on a particular application, pre-defined switching frequency, and/or load type.

Figure 2:
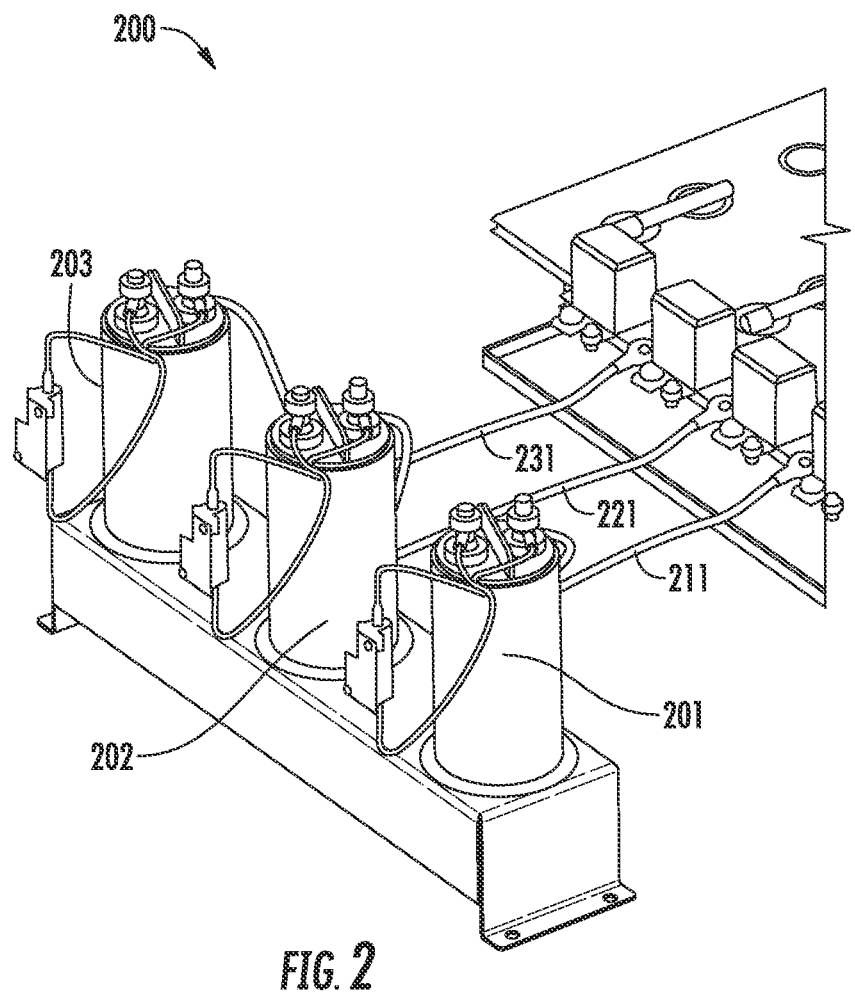
FIG. 2 is an isometric view of a portion of a low pass filter according to an exemplary embodiment.

Referring to FIG. 2, an isometric view of various elements of a low pass filter (LPF) 200 is depicted according to an exemplary embodiment. The LPF 200 includes a first capacitor 201 corresponding to a first LCL filter, a second capacitor 202 corresponding to a second LCL filter, and a third capacitor 203 corresponding to a third LCL filter. The first capacitor 201 is connected to a first inductor via a first wire 211. The second capacitor 202 is connected to a second inductor via a second wire 221. The third capacitor 203 is connected to a third inductor 3 via a third wire 231. It is to be appreciated that the first wire 211, second wire 221, and third wire 231 may include a first wire (or first portion) that connects the capacitor to the respective inductors and a second wire (or second portion) that connects the capacitor to the common terminal or ground terminal.

The first wire 211, second wire 221, and third wire 231 have a length that is based on the equivalent series inductance of the particular gauge of the wire used such that the LCL filter is designed to have a notch within the frequency response of the LCL filter at the predefined switching frequency of a corresponding inverter drive circuit. That is, the equivalent series inductance of the first LCL filter includes the parasitic inductance of the first capacitor 201 and the parasitic inductance of the first wire 211. The parasitic inductance of the first capacitor 201 may be tested or measured at the maximum current that the LCL filter will be handling within a particular application. The length of the first wire 211 may be selected based on a known or measured series inductance of the particular type and/or gauge of wire being used for the particular application such that the combination of the parasitic inductance of the first capacitor 201 and the parasitic inductance of the first wire 211 cause the frequency response of the LCL filter to have a notch (e.g., maximum attenuation) at the predetermined switching frequency. In some embodiments, the length of wire 211 may also be supplemented with another inductor element such that the equivalent series inductance is selected to maximize attenuation at the predefined switching frequency.

Figure 3:
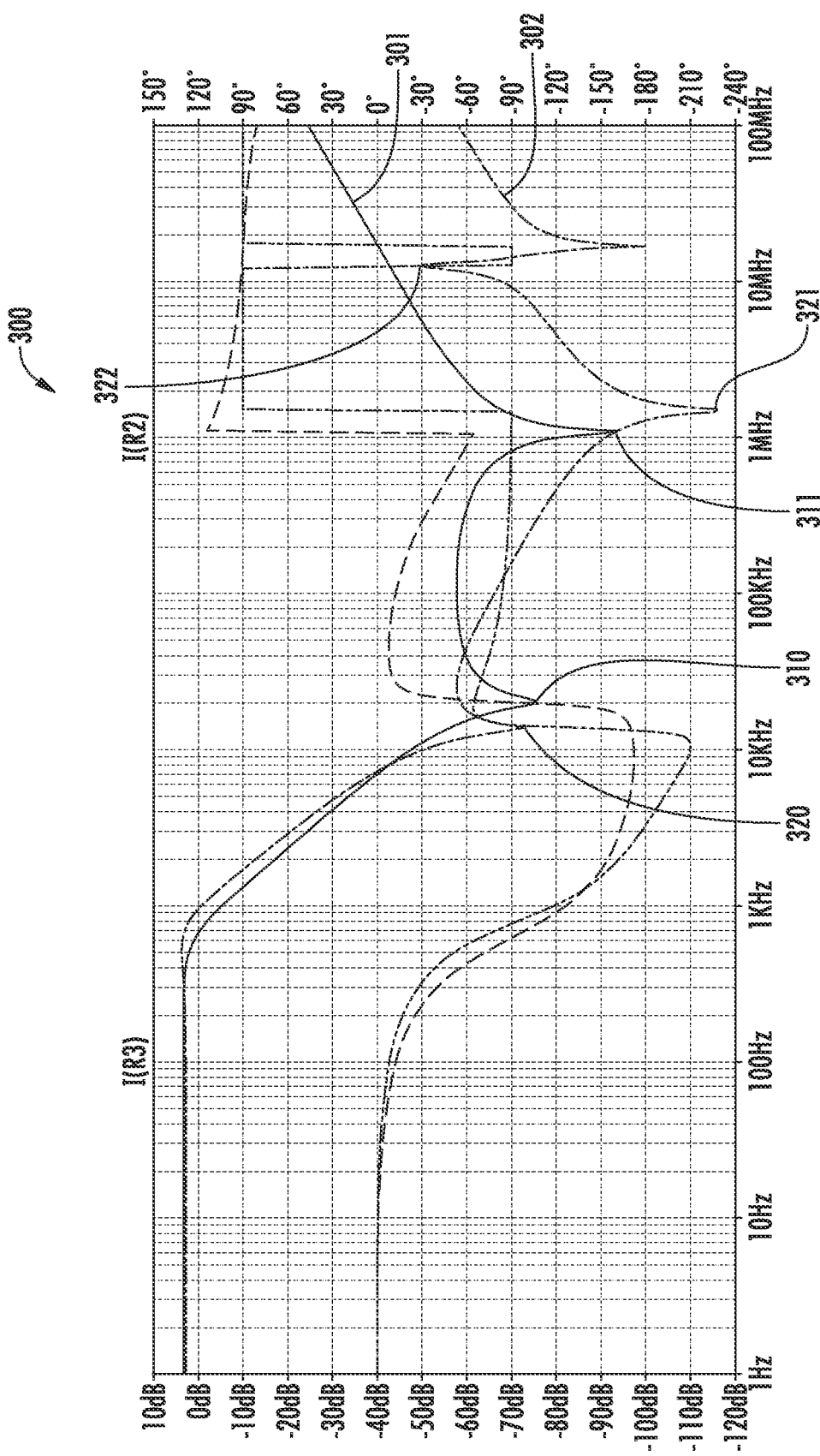
FIG. 3 is a graph of frequency responses of a low pass filters according to an exemplary embodiment.

Referring to FIG. 3, a frequency response graph 300 of a LPF is depicted according to an exemplary embodiment. The frequency response graph 300 includes a first frequency response 301 for a baseline LC-LPF filter and a second frequency response 302 for a LCL-LPF filter having parasitic compensation with a resistive load.

The first frequency response 301 shows a first notch 310 at about 20 kilo-Hertz (kHz) and a second notch 311 at about 1.1 mega-Hertz (MHz). The first notch 310 is dominated or controlled by the equivalent series resistance of the capacitor leg of the filter. However, the switching frequency may be predetermined or set in the controller 103 to be located at about 12.5 kHz. Accordingly, the baseline LC-LPF only attenuates the dominant frequency caused by the switching frequency at about 12.5 kHz by about 55 decibels (dB), which is less than the desired about 60 dB attenuation.

The second frequency response 302 shows a first notch 320 at about 12.5 kHz, a second notch 321 at about 1.6 MHz, and a peak 322 at about 12 MHz. Accordingly, the equivalent series resistances of the capacitor leg of the LPF filter having parasitic compensation was changed such that the first notch 320 was shifted to about 12.5 kHz at the switching frequency. The second notch 321 is caused by or dominated by the parasitic capacitance of the first inductor of the LCL filter and the peak 322 is caused by or dominated by the parasitic capacitance of the second inductor of the LCL filter. Moreover, as can be seen, in addition to the first notch 320 being positioned at the switching frequency, the frequencies above about 13 kHz are also attenuated greater than the baseline filter. Accordingly, the LPF filter having parasitic compensation can be designed to have a desirable frequency response (e.g., a notch or minimum at the switching frequency) by selecting a capacitor having a particular parasitic inductance and selecting a wire (e.g., wire connections of the capacitor leg of the filter) at a particular length or gauge such that the capacitor leg has a particular equivalent series inductance based on the application. Further, the second notch 321 may be moved to a different location by adjusting or changing the design of the parasitic capacitance of the first inductor and the third peak can be moved to a different location by adjusting or changing the design of the parasitic capacitance of the second inductor. For example, in the case that the switching frequency includes a spread spectrum frequency (e.g., the PWM is not square), the second notch 321 may be adjusted by designing the parasitic capacitance of the first inductor to maximally attenuate a second frequency within the spread spectrum of frequencies.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. No claim element herein is to be construed as a means-plus-function element (e.g., under the provisions of 35 U.S.C. § 112, sixth paragraph) unless the element is expressly recited using the phrase "means for." Furthermore, no element, component or method step in the present disclosure is intended to be dedicated to the public, regardless of whether the element, component or method step is explicitly recited in the claims.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system comprising:
   a direct current (DC) power supply configured to provide a DC signal; and
   an inverter connected to the DC power supply and configured to output an alternating current (AC) signal, the inverter comprising:
      a driver comprising a plurality of transistors configured to receive the DC signal and output a pulse-width modulated signal at a switching frequency; and
      a low pass filter (LPF) connected to an output of the plurality of transistors and comprising a plurality of electronic circuit components each having parasitic inductances that combined have an equivalent series inductance configured to have notches in a frequency response of the LPF at the switching frequency of the driver and a cut-off frequency, wherein the LPF is configured to receive the pulse-width modulated signal and output a filtered signal.

2. The system of claim 1, wherein the plurality of electronic circuit components comprises:
   a first inductor connected to an output of a first set of the plurality of transistors; and
   a second inductor connected to the first inductor and an output terminal.

3. The system of claim 2, wherein the plurality of electronic circuit components further comprises a capacitor connected to the first inductor, the second inductor, and the DC power supply via a first wire, wherein the capacitor has a first parasitic inductance and the first wire has a second parasitic inductance, and wherein the first parasitic inductance and the second parasitic inductance have a series inductance having a notch in the frequency response of the LPF at the switching frequency.

4. The system of claim 3, wherein the first wire comprises a first portion connecting a first terminal of the capacitor to the first inductor and a second portion connecting a second terminal of the capacitor to a common terminal.

5. The system of claim 3, wherein the switching frequency is predefined and the length of the first wire is based on the switching frequency.

6. The system of claim 3, wherein the LPF has a cutoff frequency in the range of about 1 to about 1.5 kHz, and wherein the switching frequency is about 12.5 kHz.

7. The system of claim 1, further comprising a controller configured to control the driver to turn on or turn off the plurality of transistors.

8. The system of claim 1, wherein the driver is configured to provide two additional outputs having different pulse width modulated signals, and wherein the system further comprises two additional LPFs configured to receive the different pulse width modulated signals respectively.

9. A system comprising:
   a direct current (DC) power supply configured to provide a DC signal; and
   an inverter connected to the DC power supply and configured to output an alternating current (AC) signal, the inverter comprising:
      a driver comprising a plurality of transistors configured to receive the DC signal and output a plurality of pulse-width modulated signals at a switching frequency from a plurality of output terminals; and
      a plurality of low pass filters (LPFs) connected to the plurality of output terminals and each LPF comprising a plurality of electronic circuit components, wherein each of the plurality of electronic circuit components has parasitic inductances that combined have an equivalent series inductance configured to have a notch in a frequency response of the LPFs at the switching frequency of the driver and a cut-off frequency, and wherein each LPF is configured to receive the respective pulse-width modulated signal and output a filtered signal.

10. The system of claim 9, wherein the plurality of electronic circuit components of each of the plurality of LPFs comprises:
    a first inductor connected to one of the plurality of output terminals; and
    a second inductor connected to the first inductor and the output terminal.

11. The system of claim 10, wherein the plurality of electronic circuit components of each of the plurality of LPFs further comprises a capacitor connected to the first inductor, the second inductor, and the DC power supply via a first wire, wherein the capacitor has a first parasitic inductance and the first wire has a second parasitic inductance, and wherein the first parasitic inductance and the second parasitic inductance have a series inductance having a notch in the frequency response of the respective LPF at the switching frequency.

12. The system of claim 11, wherein the first wire comprises a first portion connecting a first terminal of the capacitor to the first inductor and a second portion connecting a second terminal of the capacitor to a common terminal.

13. The system of claim 11, wherein the switching frequency is predefined and the length of the first wire is based on the switching frequency.

14. The system of claim 11, wherein the LPF has a cutoff frequency in the range of about 1 to about 1.5 kHz, and wherein the switching frequency is about 12.5 kHz.

15. The system of claim 9, further comprising a controller configured to control the driver to operate the plurality of transistors at the switching frequency.

16. An inverter, comprising:
    an input connected to a direct current (DC) power supply and configured to receive a DC signal from the DC power supply;
    a driver comprising a plurality of transistors connected to the input and configured to output a pulse-width modulated signal at a switching frequency; and
    a low pass filter (LPF) comprising a plurality of electronic circuit components each having parasitic inductances that combined have an equivalent series inductance configured to have a notch in a frequency response of the LPF at the switching frequency of the driver and a cut-off frequency, the LPF connected to an output of the plurality of transistors and configured to receive the pulse-width modulated signal and output a filtered signal.

17. The inverter of claim 16, wherein the plurality of electronic circuit components comprise:
    a first inductor connected to an output of a first set of the plurality of transistors;
    a second inductor connected to the first inductor and an output terminal; and a capacitor connected to the first inductor, the second inductor, and the DC power supply via a first wire, wherein the capacitor has a first parasitic inductance and the first wire has a second parasitic inductance, and wherein the first parasitic inductance and the second parasitic inductance have a series inductance having a notch in the frequency response of the LPF at the switching frequency.

18. The inverter of claim 17, wherein the first wire comprises a first portion connecting a first terminal of the capacitor to the first inductor and a second portion connecting a second terminal of the capacitor to a common terminal.

19. The inverter of claim 17, wherein the switching frequency is predefined and the length of the first wire is based on the switching frequency.

20. The inverter of claim 16, wherein the driver is configured to provide two additional outputs having different pulse width modulated signals, and wherein the system further comprises two additional LPFs configured to receive the different pulse width modulated signals respectively.

* * * * *